United States Patent
Castellanos et al.

(10) Patent No.: US 8,898,146 B2
(45) Date of Patent: Nov. 25, 2014

(54) SYSTEM AND METHOD FOR COMPARING DATABASE QUERY PLANS

(75) Inventors: Maria G. Castellanos, Sunnyvale, CA (US); Perla Ruiz, Sonora (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 149 days.

(21) Appl. No.: 12/887,895

(22) Filed: Sep. 22, 2010

(65) Prior Publication Data

US 2012/0072413 A1    Mar. 22, 2012

(51) Int. Cl.
  *G06F 17/30* (2006.01)

(52) U.S. Cl.
  CPC .... *G06F 17/30306* (2013.01); *G06F 17/30445* (2013.01)
  USPC ..................... 707/718; 707/E17.017; 718/100

(58) Field of Classification Search
  CPC ..................... G06F 17/30306; G06F 17/30463; G06F 17/30445; G06Q 10/0633; H04L 41/12; H04L 41/145; H04Q 2213/13098; H04W 16/18; H04W 16/22; H04W 24/02
  USPC .......... 707/718, E17.017, 713, 715, 719, 721, 707/714, E17.005, E17.014, 758, 769, 780, 707/783, 786, 796, 797, 790, E17.075, 707/E17.132, E17.01, 7, E17.131, E17.104, 707/E17.05, E17.042, E17.043, 999.002; 718/100
  See application file for complete search history.

(56) References Cited

U.S. PATENT DOCUMENTS

| | | | | |
|---|---|---|---|---|
| 5,367,675 A | * | 11/1994 | Cheng et al. | 707/999.002 |
| 5,943,666 A | * | 8/1999 | Kleewein et al. | 707/E17.032 |
| 6,092,062 A | * | 7/2000 | Lohman et al. | 707/E17.032 |
| 6,112,198 A | * | 8/2000 | Lohman et al. | 707/E17.032 |
| 6,236,993 B1 | | 5/2001 | Fanberg | |
| 6,345,267 B1 | * | 2/2002 | Lohman et al. | 707/E17.032 |
| 6,356,887 B1 | * | 3/2002 | Berenson et al. | 707/999.002 |
| 6,389,430 B1 | * | 5/2002 | Parker | 707/E17.005 |
| 6,457,020 B1 | * | 9/2002 | Carey et al. | 707/714 |
| 6,643,652 B2 | * | 11/2003 | Helgeson et al. | 707/E17.006 |
| 6,714,938 B1 | * | 3/2004 | Avadhanam et al. | 707/E17.032 |
| 6,763,359 B2 | * | 7/2004 | Lohman et al. | 707/718 |
| 6,801,903 B2 | | 10/2004 | Brown et al. | |
| 6,912,555 B2 | * | 6/2005 | Lemon et al. | 715/239 |
| 7,031,974 B1 | * | 4/2006 | Subramaniam | 707/E17.032 |
| 7,035,843 B1 | * | 4/2006 | Bellamkonda et al. | 707/E17.017 |
| 7,054,893 B2 | * | 5/2006 | Mogi et al. | 707/999.2 |
| 7,185,000 B1 | * | 2/2007 | Brown et al. | 707/718 |
| 7,234,112 B1 | | 6/2007 | Brown et al. | |
| 7,370,043 B1 | | 5/2008 | Shelton et al. | |
| 7,415,455 B2 | * | 8/2008 | Karn et al. | 707/999.002 |

(Continued)

OTHER PUBLICATIONS

Markl et al. "Robust query processing through progressive optimization"—Proceeding SIGMOD '04 Proceedings of the 2004 ACM SIGMOD international conference on Management of data—Jun. 13-18, 2004, pp. 659-670.*

(Continued)

*Primary Examiner* — Anh Ly

(57) ABSTRACT

A method and device may accept a first database query plan including a plurality of rows and a second database query plan including a plurality of rows, compare each row in the first database query plan with a corresponding row in the second database query plan, and based on each comparison, calculate a difference between the compared rows. Each difference may be recorded in an output file.

16 Claims, 7 Drawing Sheets

(56) References Cited

U.S. PATENT DOCUMENTS

| | | | |
|---|---|---|---|
| 7,743,052 B2* | 6/2010 | Bestgen et al. | 707/715 |
| 7,840,556 B1* | 11/2010 | Dayal et al. | 707/721 |
| 7,941,425 B2* | 5/2011 | Sahu et al. | 707/718 |
| 7,966,313 B2* | 6/2011 | Bruno et al. | 707/713 |
| 8,176,080 B2* | 5/2012 | Castellanos et al. | 707/786 |
| 2001/0049685 A1* | 12/2001 | Carey et al. | 707/103 R |
| 2002/0198867 A1* | 12/2002 | Lohman et al. | 707/3 |
| 2003/0093439 A1* | 5/2003 | Mogi et al. | 707/200 |
| 2003/0140311 A1* | 7/2003 | Lemon et al. | 715/513 |
| 2004/0122798 A1* | 6/2004 | Lin et al. | 707/2 |
| 2005/0097078 A1* | 5/2005 | Lohman et al. | 707/2 |
| 2005/0235004 A1* | 10/2005 | Folkert et al. | 707/201 |
| 2005/0267866 A1* | 12/2005 | Markl et al. | 707/2 |
| 2006/0015490 A1* | 1/2006 | Denuit et al. | 707/4 |
| 2006/0074965 A1* | 4/2006 | Cunningham et al. | 707/102 |
| 2006/0106839 A1* | 5/2006 | Shen et al. | 707/101 |
| 2006/0195416 A1* | 8/2006 | Ewen et al. | 707/2 |
| 2006/0218123 A1* | 9/2006 | Chowdhuri et al. | 707/2 |
| 2006/0218149 A1* | 9/2006 | Patrick | 707/9 |
| 2007/0027860 A1* | 2/2007 | Bestgen et al. | 707/5 |
| 2007/0050330 A1* | 3/2007 | Karn et al. | 707/2 |
| 2007/0192372 A1* | 8/2007 | Bestgen et al. | 707/200 |
| 2008/0040334 A1* | 2/2008 | Haber et al. | 707/4 |
| 2008/0133457 A1* | 6/2008 | Priyadarshi et al. | 707/2 |
| 2008/0183644 A1* | 7/2008 | Bruno et al. | 706/12 |
| 2008/0186344 A1* | 8/2008 | Hara | 347/14 |
| 2008/0215531 A1* | 9/2008 | Markl et al. | 707/2 |
| 2008/0256024 A1* | 10/2008 | Downer et al. | 707/2 |
| 2008/0275840 A1* | 11/2008 | Burger et al. | 707/2 |
| 2008/0281784 A1* | 11/2008 | Zane et al. | 707/3 |
| 2008/0301085 A1* | 12/2008 | Faunce et al. | 707/2 |
| 2009/0049012 A1* | 2/2009 | Bossman et al. | 707/3 |
| 2009/0094191 A1* | 4/2009 | Chaudhuri et al. | 707/2 |
| 2009/0106219 A1* | 4/2009 | Belknap et al. | 707/4 |
| 2009/0106321 A1* | 4/2009 | Das et al. | 707/200 |
| 2009/0276394 A1* | 11/2009 | Bestgen et al. | 707/2 |
| 2009/0327254 A1* | 12/2009 | Bruno et al. | 707/4 |
| 2010/0036801 A1* | 2/2010 | Pirvali et al. | 707/2 |
| 2010/0082602 A1* | 4/2010 | Ganapathi et al. | 707/718 |
| 2010/0191720 A1* | 7/2010 | Al-Omari et al. | 707/718 |
| 2010/0198808 A1* | 8/2010 | Graefe et al. | 707/713 |
| 2010/0198810 A1* | 8/2010 | Graefe et al. | 707/718 |
| 2010/0198811 A1* | 8/2010 | Wiener et al. | 707/718 |
| 2010/0228783 A1* | 9/2010 | Castellanos et al. | 707/797 |
| 2011/0161310 A1* | 6/2011 | Tang et al. | 707/714 |
| 2011/0209149 A1* | 8/2011 | Simitsis et al. | 718/100 |
| 2012/0072413 A1* | 3/2012 | Castellanos et al. | 707/718 |
| 2012/0246189 A1* | 9/2012 | Castellanos et al. | 707/769 |
| 2013/0041887 A1* | 2/2013 | Egan et al. | 707/718 |

OTHER PUBLICATIONS

Bernardo Miranda, Alexandre A. B. Lima, Patrick Valduriez, and Marta Mattoso—"Apuama: Combining Intra-query and Inter-query Parallelism in a Database Cluster"—Current Trends in Database Technology—EDBT 2006 Lecture Notes in Computer Science vol. 4254, 2006, pp. 649-661.*

* cited by examiner

250 ⟶

Plans Comparator

Create XML Plans

First query set File: \createPlans\queriesFirstSet.sql [Browse]
Second query set File: \createPlans\queriesSecondSet.sql [Browse]
☑ Create Plans For First Set
Folder to save First Set: \createPlans\FirstSet [Browse]
☑ Create Plans For Second Set
Folder to save Second Set: \createPlans\SecondSet [Browse]

DBMS
DataBase: SQL server ▽
Host: localhost
Schema: TPCDS
Catalog: TPCDS
User: Root
Password: ********
[Check Connection]

[Start]

Plan comparison criteria
☑ By Operator
☑ By Cost
☑ By Cardinality

Results
Plan comparison detail: \results\report.xls [Browse]
Plan differences log: \results\differencesLog.txt [Browse]

FIG. 3

| Plan00123.sqlplan: | | | | | | | |
|---|---|---|---|---|---|---|---|
| | Total Version 1 | StatementEstRows: 11059.9 | StatementSubTreeCost:27.488 | | | | |
| | Total Version 2 | StatementEstRows: 11059.9 | StatementSubTreeCost:64.988 | | | | |
| | | | | | | | |
| | Version 1 | Version 2 | Version 1 | Version 2 | Version 1 | Version 2 | |
| | EstimateRows | EstimateRows | LogicalOp | LogicalOp | EstimatedTotalSubtreeCost | EstimatedTotalSubtreeCost | |
| | 11059.9 | 11059.9 | Gather Streams | Gather Streams | 27.488 | 64.988 | |
| | 11059.9 | 11059.9 | Sort | Sort | 27.337 | 64.837 | |
| | 11059.9 | 11059.9 | Compute Scalar | Compute Scalar | 26.9903 | 64.4903 | |
| | 11059.9 | 11059.9 | Aggregate | Aggregate | 26.9898 | 64.4898 | |
| | 22119.8 | 22119.8 | Repartition Streams | Repartition Streams | 26.294 | 63.794 | |
| | 22119.8 | 22119.8 | Partial Aggregate | Partial Aggregate | 26.0552 | 63.5552 | |
| | 223792 | 223792 | Inner Join | Inner Join | 24.1879 | 61.6879 | |
| | 12 | 12 | Distribute Streams | Distribute Streams | 0.0318296 | 0.0325704 | |
| | 12 | 12 | Compute Scalar | Compute Scalar | 0.0032964 | 0.00403714 | |
| | 12 | 12 | Clustered Index Scan | Table Scan | 0.0032952 | 0.00403594 | |
| | 248658 | 248657 | Inner Join | Inner Join | 23.0807 | 60.58 | |
| | 100000 | 100000 | Bitmap Create | Bitmap Create | 5.35641 | 4.14167 | |
| | 100000 | 100000 | Repartition Streams | Repartition Streams | 5.35641 | 4.14167 | |

FIG. 4

| | | | | |
|---|---|---|---|---|
| 100000 | 100000 | Inner Join | 5.16324 | 3.94851 |
| 50000 | 50000 | Compute Scalar | 1.20279 | 0.885048 |
| 50000 | 50000 | Repartition Streams | 1.20029 | 0.882548 |
| 50000 | 50000 | Clustered Index Scan | 1.08256 | 0.764817 |
| 100000 | 100000 | Repartition Streams | 3.09113 | 2.19413 |
| 100000 | 100000 | Clustered Index Scan | 2.90487 | 2.00787 |
| 248658 | 248657 | Repartition Streams | 15.7912 | 54.5052 |
| 248658 | 248657 | Inner Join | 14.0664 | 52.7804 |
| 22.2019 | 22.2019 | Bitmap Create | 1.00831 | 1.00831 |
| 22.2019 | 22.2019 | Distribute Streams | 1.00831 | 1.00831 |
| 22.2019 | 22.2019 | Clustered Index Scan | 0.915488 | 0.915488 |

FIG. 4 (Cont.)

| There are Differences for StatementEstRows (nodeID3): | Values: | 241.507 | Difference: | 0.007 |
| There are Differences for StatementSubTreeCost (nodeID 6): | Values: | 34.479 | Difference: | 8.307 |
| There are Differences for Logical Operator: Compute Scalar (nodeID 7): | Card. Values: | 241.507 | Difference: | 0.007 |
| There are Differences for Logical Operator: Compute Scalar (nodeID 30): | Cost Values: | 34.479 | Difference: | 8.307 |
| There are Differences for Logical Operator: Gather Streams (nodeID 31): | Card. Values: | 241.507 | Difference: | 0.007 |
| There are Differences for Logical Operator: Gather Streams (nodeID 32): | Cost Values: | 34.479 | Difference: | 8.307 |
| There are Differences for Logical Operator: Aggregate (nodeID 33): | Card. Values: | 241.507 | Difference: | 0.007 |
| There are Differences for Logical Operator: Aggregate (nodeID 55): | Cost Values: | 34.450 | Difference: | 8.307 |
| There are Differences for Logical Operator: Sort (nodeID 59): | Card. Values: | 483.014 | Difference: | 0.014 |
| There are Differences for Logical Operator: Sort (nodeID 63): | Cost Values: | 34.450 | Difference: | 8.307 |
| There are Differences for Logical Operator: Repartition Streams (nodeID 78): | Card. Values: | 483.014 | Difference: | 0.014 |
| There are Differences for Logical Operator: Repartition Streams (nodeID 82): | Cost Values: | 34.441 | Difference: | 8.307 |

FIG. 5 plan001.sqlplan the execution plans are different because of the number of nodes
plan001: Cost Difference: 44.8917605923l5684% plan: plan001.sqlplan. is different on the logical operation (nodelD 1):   version 1: Inner Join Operator,
                                                                            version 2: Sort plan: plan001.sqlplan. is different on the logical operation (nodelD 2):   version 1: Bitmap Create Operator,
                                                                            version 2: Inner Join plan: plan001.sqlplan. is different on the logical operation (nodelD 3):   version 1: Clustered Index Scan Operator,
                                                                            version 2: Table Scan plan: plan001.sqlplan. is different on the logical operation (nodelD 4):   version 1: Bitmap Create Operator,
                                                                            version 2: Inner Join plan: plan001.sqlplan. is different on the logical operation (nodelD 5):   version 1: Inner Join Operator,
                                                                            version 2: Repartition Streams plan: plan001.sqlplan. is different on the logical operation (nodelD 6):   version 1: Repartition Streams Operator,
                                                                            version 2: Clustered Index Scan plan: plan001.sqlplan. is different on the logical operation (nodelD 7):   version 1: Inner Join Operator,
                                                                            version 2: Repartition Streams plan: plan001.sqlplan. is different on the logical operation (nodelD 8):   version 1: Repartition Streams Operator,
                                                                            version 2: Table Scan plan: plan001.sqlplan. is different on the logical operation (nodelD 9):   version 1: Clustered Index Scan Operator,
                                                                            version 2: Repartition Streams plan: plan001.sqlplan. is different on the logical operation (nodelD 10):  version 1: Repartition Streams Operator,
                                                                            version 2: Clustered Index Scan plan: plan001.sqlplan. is different on the logical operation (nodelD 11):  version 1: Clustered Index Scan Operator,
                                                                            version 2: Clustered Index Seek

SYSTEM AND METHOD FOR COMPARING DATABASE QUERY PLANS

BACKGROUND

Database management systems (DBMSs) manage data stored in databases and enable users to formulate queries over the data, returning the corresponding results. For example, a query could be, "give me the names of employees working on projects in the oil and gas industry". DBMSs include or use optimizers to receive queries (or compiled versions of queries) and produce query execution plans (also termed query plans or execution plans). An execution plan is a tree, set or list of operators (e.g., logic operators) or other commands that instructs another unit, such as an executor, how to execute the query: for example which specific operators to apply and in which order, and how to access the data. Optimizers typically produce execution plans estimated by the optimizer to be optimal in execution cost. Cost may be determined based on processor (CPU) usage, input/output (I/O) cost, or other resource usage, and may be a combined measure of various costs.

Execution plans for the same query may differ when applied to or based on databases having different structures and sizes, different optimizers, or differences between DBMSs, or other differences. Thus if for a given DBMS or data associated with a DBMS a change in its characteristics or attributes occurs (e.g., a change in the structure or indexing of the data, the physical layout or storage of the data, the amount of the data, or the optimizer), the execution plan for a query may change. Various characteristics of a DBMS or data associated with a DBMS may change. Data may change if, e.g., sanitized (e.g., where sensitive information is made safe for wider visibility) or desensitized, if new rows are inserted, or the amount of data changes. An optimizer may change how it constructs a plan or how it relies on the distribution of data. The physical design of the data may change in that the indexes to the data may change, or the partitioning of data may change.

The results of changes in the attributes of the DBMS may include changes, in the resulting query plan, of cardinality and cost estimations (which may be included as part of a query plan), operator choices, operator ordering or arrangement, or other differences.

DBMSs typically make the execution plans available to the users in a human readable or machine-readable form. A DBMS may include a user interface, front end or utility that depicts the plan in a graphical or hierarchical manner, e.g. as a list or operator tree. Some provide different panels with different information about the plan. For example, one DMBS displays the operator tree in one panel and, separately, statistics and cost estimates for each operator, row or line in another panel. Others display a graph (e.g., a flow) of operators. A user may indicate (e.g., by clicking using a pointing device) an operator, and a display (e.g. a window) may expand and contain cost estimates for that operator.

It is common for users (e.g., database administrators and optimizer developers) to compare the plans before and after a change in attributes of a DBMS (e.g., in the optimizer or the data) to analyze the effect of the change in the plan and performance.

Such evaluation is difficult using current query plan viewing tools, as a query plan may be complex and lengthy, and may include much detailed information such as operators that will be applied to execute the query, estimated cardinalities (amount of results, e.g., rows or tuples estimated to be produced for an operator) for the intermediate results and estimated costs of executing each operator. Analyzing this information manually using current tools is cumbersome and time consuming.

BRIEF DESCRIPTION OF THE DRAWINGS

FIG. 3 illustrates a user interface presented to a user, requesting information from a user regarding a query or queries to be analyzed;

FIG. 4 illustrates a report according to an embodiment of the present invention;

FIG. 5 illustrates a report or part of a report, showing differences, according to an embodiment of the present invention; and FIG. 6 illustrates a report or part of a report, showing differences, according to an embodiment of the present invention.

Figure 1:
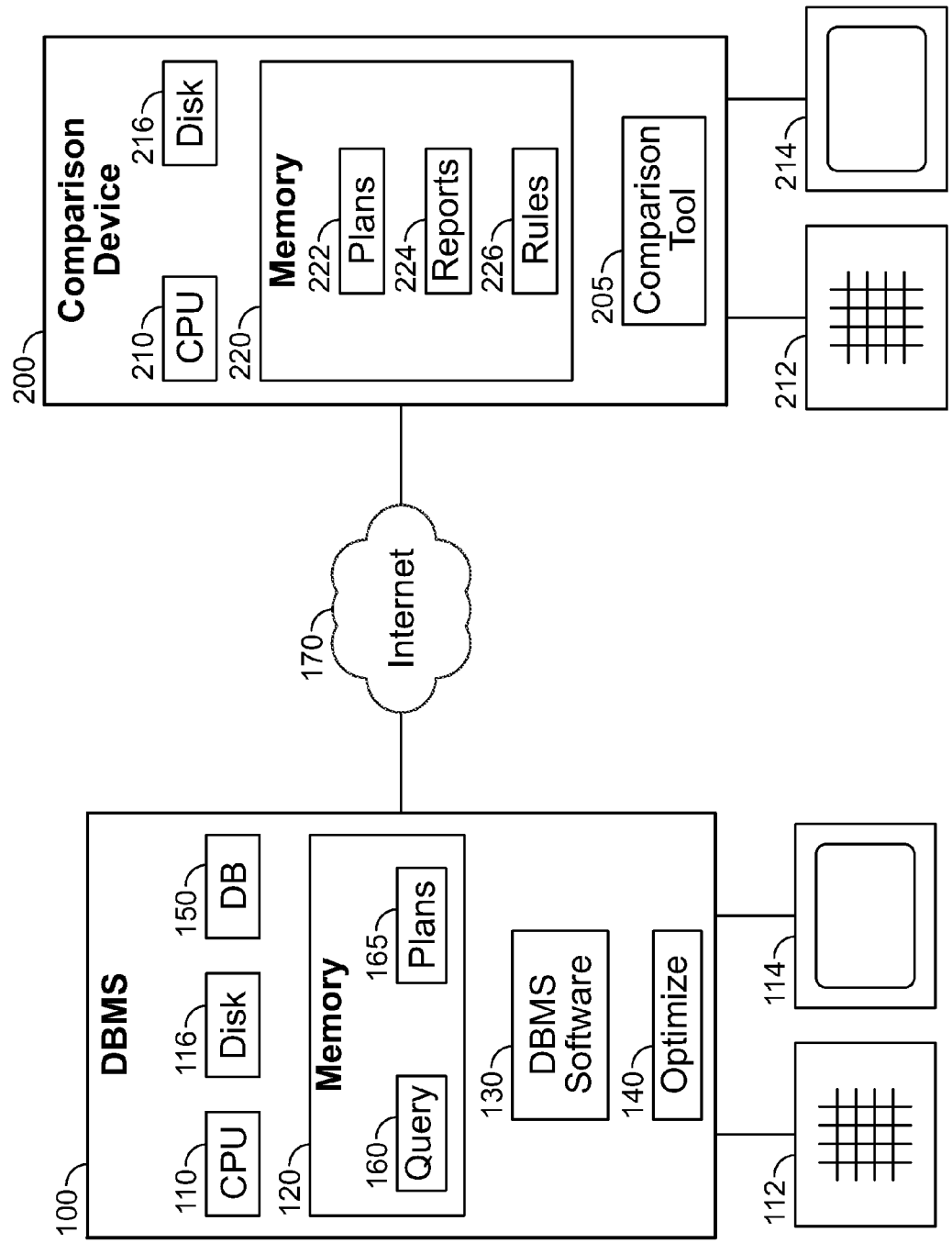
FIG. 1 is a schematic diagram of a database management system and user comparison workstation according to embodiments of the invention.

Reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, throughout the specification discussions utilizing terms such as "processing", "computing", "storing", "determining", or the like, refer to the action and/or processes of a computer or computing system, or similar electronic computing device, that manipulates and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatuses may be specially constructed for the desired purposes, or may comprise computers or processors selectively activated or reconfigured by a computer program stored in the computers. Such computer programs may be stored in a computer-readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein.

Embodiments of the invention may include an article such as a computer or processor readable storage medium, such as for example a memory, a disk drive, or a USB flash memory, encoding, including or storing instructions, e.g., computer-executable instructions, which when executed by a processor or controller, carry out methods disclosed herein.

A system and method according to an embodiment of the invention may provide a row-by-row or operator-by-operator comparison of query execution plans. A set (one or more) of execution plans may be produced from a set of queries by, for example, an optimizer or other tool. A change may be made in the DBMS on which the execution plans are based, e.g., to the data, data structure, or the data managed by the DBMS, or the optimizer. The same set of queries may be used to produce a new set of execution plans based on the modified DBMS. Queries may produce different execution plans under different conditions. A user may define a source and a destination, or other parameters, for a comparison tool. A computer-readable representation, e.g. using Extensible Markup Language (XML), may be made of each execution plan. For each pair of execution plans based on a query, a row-by-row or operator-by-operator comparison may be created. The comparison may, for each operator (e.g., logic operator), command or row, show the differences between the execution plan based on the query applied to the original DBMS and the plan based on the query applied to the post-change DBMS (after the DBMSs or data characteristics are changed). Differences may include, for example, differences in cardinality, differences in cost, or differences in operators. In some cases, for a certain row or line, a pre-change plan and post-change plan may include a different operator. In other cases, operators may be moved or have their position changed from a pre-change plan to a post-change plan.

Embodiments of the invention may allow users of or developers of DBMSs to quickly and efficiently analyze differences between versions of DBMSs. Embodiments of the invention may allow a developer changing a DBMS to easily and quickly understand the performance impact on the query execution. A developer may make a DBMS or data change not wanting a change in performance, and an embodiment of the present invention may allow the developer to determine, if changes occur, what aspects of the DBMS system change cause the plan changes. Conversely, a developer may make a DBMS change intending to improve performance, and embodiments of the present invention may allow the developer to determine which DBMS changes cause the plan changes. Embodiments of the invention may also allow a database administrator assess the impact of changes to the physical design of the database.

Once query plans are produced, the query plan information can be represented in a standard or common format that facilitates the comparison of operators or commands and their attributes between two execution plans. Many DBMSs or optimizers produce a computer-readable representation, e.g. in XML, of the execution plans they produce. Each DBMS or optimizer typically produces an execution plan in a unique format, differing from that of each other optimizer. A comparison tool according to an embodiment of the present invention may store a number of sets of rules (e.g., parsing rules) or representations, each describing or embodying the structure of a query plan produced by a particular DBMS or optimizer. Representations may differ from one DBMS to another for example in the structure of plan information, or in the XML tags and attributes. However, typically, a tag exists in a plan representation marking where a given piece of information starts and ends. Thus, by including in a plan such tags and other information a comparison tool may use, e.g., a parser searching for tags or other information and extracting the tagged information. Thus in some embodiments a comparison tool may be DBMS agnostic.

FIG. 1 is a schematic diagram of a database management system and user comparison workstation according to embodiments of the invention. DBMS 100 may manage and store one or more databases. Comparison device 200 may analyze or control DBMS functionality and may compare query plans produced by or for DBMS 100. DBMS 100 and comparison device may be connected, e.g., via a network such as the Internet 170, but need not be connected. DBMS 100 may include one or more CPUs or processors 110 and one or more memories 120. Comparison device 200 may include one or more processors 210 and one or more memories 220. DBMS 100 and comparison device 200 may include user input devices 112 and 212 (e.g., keyboards, pointing devices such as mice, etc.), user output devices 114 and 214 such as monitors or printers, and mass or long term storage devices 116 and 216 such as hard disk drives. Data stored in each of memory 120 and 220 may be stored in devices 116 and 216, respectively, and vice versa. In some embodiments, each of DBMS 100 and comparison device 200 may be workstations, personal computers, laptop computers, or may each include one or more such units. Furthermore, as with other units or modules described herein, their functions may be divided between two or more units. For example, the functionality of comparison device 200 may be carried out by DBMS 100 (e.g., by processor 110).

DBMS 100 may include or execute database management software 130, optimizer 140, and one or more databases 150. Database management software 130 may include instructions or code to, for example manage access requests to database 150. Optimizer 140 may optimize execution plans for queries. Optimizer 140 may generate alternate execution plans for a given query and select the optimal query plan (e.g., the most cost-effective plan, the plan that executes the query in the shortest time, etc.). Queries 160 (and other database or user data), generated query execution plans 165, database management software 130, optimizer 140, and database 150, may be stored in memory 120. In one embodiment, database management software 130 and optimizer 140 are modules which are code or instructions, e.g. stored in memory 120, which are executed by processor 110, and in such embodiments processor 110 functions as database management software 130 and optimizer 140. Alternately, database management software 130 and optimizer 140 may be dedicated hardware structures.

Comparison device 200 may include or execute comparison tool 205, comparing and displaying results of comparisons of query plans. The functionality of device 200 may be part of DMBS 100, or comparison device 200 may be a separate computing system. Comparison tool 205 may be, for example, instructions or code, e.g., stored in memory 220 and executed by processor 210. Comparison device 200 may accept input (e.g., query plans) from DBMS 100 via, for example, a network, or by the physical movement of mass storage (e.g., a user storing data from DBMS 100 on a removable disk drive and transferring the disk drive to device 200).

Memory 220 may store at times, as input and output, data such as query plans 222 to be analyzed, query plan reports 224 showing the results of comparisons of query plans, and parsing rules 226. Parsing rules 226 may provide rules for comparison tool 205 to input and compare query plans from different DBMSs having different output formats. The various data items shown may be stored in other locations.

In one embodiment, comparison tool 205, or another process, inputs or accepts a machine-readable form (e.g., in XML, or another format) of one or more query execution plans including pairs of plans where each plan in a pair was generated from the same query, but is based on a database with altered attributes. For example, DBMS 100 may produce a first query plan when DBMS 100 has a first set of attributes, and a second query plan when DBMS 100 has a second set of attributes, both from the same query. Many DBMSs produce machine-readable (e.g. XML) versions of query plans. If a DBMS is used that does not perform this function, comparison tool 205 may input an actual query plan (e.g., in a format used by a DBMS) and either use the query plan directly, or convert the query plan to XML or another suitable format.

Different DBMSs produce query plans with different structures, different names for operators or commands, different metrics for cost, etc. Comparison tool 205 stores in parsing rules 226 for each DBMS it may work with data allowing the plan to be parsed. Such data may include parsing rules embedding knowledge about the tags and their semantics so that when a relevant tag pair (e.g., opening tag and closing tag) is found, the element that is enclosed by the tag pair may be extracted accordingly. Such information may include, for example, which XML tags and attributes are used by a particular DBMS. A tag or other marker typically exists marking where a given piece of information (e.g., an operator) starts and ends. Comparison tool 205, knowing such tags (e.g., via parsing rules 226) may operate or act as a parser, searching for tags or other markers and extracting the tagged or marked information. The extracted information can be represented in a common format that facilitates the comparison of operators and their attributes (e.g., estimated cardinality and estimated cost) between two execution plans. Other ways of extracting information from a plan, such as using the XPath language, may be used.

Figure 2:
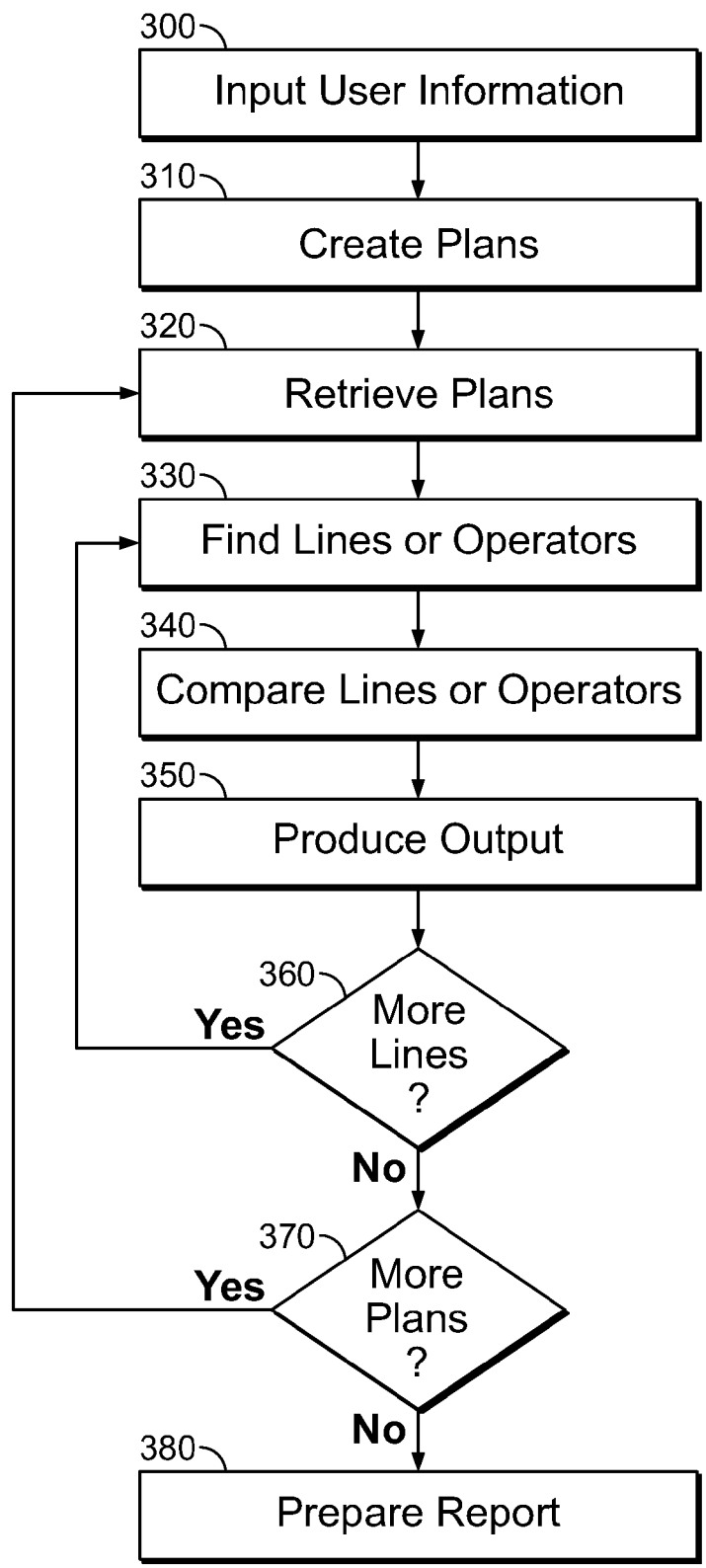
FIG. 2 is a flowchart depicting the operation of a method according to one embodiment of the invention.

FIG. 2 is a flowchart depicting the operation of a method according to one embodiment of the invention. While the embodiment depicted in FIG. 2 can be used with and carried out by the system of FIG. 1, including comparison tool 205, other systems or tools may carry out the embodiment of FIG. 2.

In operation 300, a user inputs or is asked for information. For example, a user may input or be asked for, and a process may accept, for example, the location where the two sets of queries to be compared are stored, e.g., the name of the files, possibly including pathname, whether there is a need to generate their query plans (if the queries exist but the query plans do not), the location of input/output data such as the locations or folders where the query plans are to be produced are to be stored, which DBMS is to be used (e.g., selected from a list), information required to connect to the database (e.g., the host, schema, catalog, user and password), and other information. A user may be queried for or input which criteria to use as a comparison. Examples of criteria are operator or command (e.g., which operators have changed, if operators have moved position), cardinality, and cost. Other criteria may be used.

The information may be accepted by a comparison tool 205, or another process performing plan comparison. Depending on the structure of the data, and in various embodiments of the invention, different or other data may be input.

FIG. 3 illustrates a user interface presented to a user, requesting information from a user regarding a query or queries to be analyzed. User interface 250 may be displayed to a user (e.g., on an output device 214 such as a monitor) and may allow a user to input information to a plan comparison process. The user may enter, for example, the path, file or location of the query sets, a request to create query plans from queries (if query plans have not been created), the path, file or location of the output query plans, or query plans to input, criteria by which the query plans are to be compared (e.g., cardinality, cost, operator), the path, file or location of the output results, the particular DBMS to use, or type of DBMS to be used (which may tell the process which parsing information to use), or other information. Other or different information may be input. Since the command for generating the plan for a query may be syntactically different from one DBMS to another, in some embodiments the user selects from a list of DBMSs for which the system has structural knowledge.

In operation 310, the plans to be compared may be created. The plans that the comparison tool 205, or another process, compares may exist when a user executes a plan comparison tool, in which case operation 310 need not be executed by a plan comparison tool. If the plans do not exist, a user can have the plans generated, or a plan comparison tool can have the plans generated; for example, a plan comparison tool may send the appropriate commands to the appropriate DBMS to have an optimizer produce the plans for the queries. For example, the command used to obtain an XML query plan in SQLServer is:

SET SHOWPLAN_XML ON (current-query);

In one embodiment, sets of query plans are compared pairwise according to the order of appearance of the queries, and therefore the query plans may be named to facilitate this. File names may be used to order the comparison of query plans when the comparison order for query plans does not match the order of the files in two directories. To use the names, the plans generated from the same query may be named in the same way (with each one being located in a different directory). In one embodiment, a database optimizer may process queries and return each machine-readable (e.g., XML format) plan to a plan generation component which may write it to a file (e.g., located in a folder indicated by the user in step 320, below) named for example "planX" where X is the order of appearance of the query in the query directory or file (e.g., plan5). When all the plans have been generated and stored in their corresponding files, a notification message may be displayed to a user.

After the query plans have been input into comparison tool 205 (e.g., in or as part of query plans 222) or another process, each pair of plans may be compared. Often, a number of different queries are used by developers to evaluate a DBMS or a change to a DBMS (each query using a different aspect of the data or the DBMS). Thus in some cases a number of queries may be evaluated using an embodiment of the invention.

In operation 320, a pair of plans may be retrieved, e.g., from a folder or destination specified by a user. For example, comparison tool 205 may access folders where the plans generated previously were stored and accept a pair of database query plans. In one embodiment, plans generated using a DBMS with first attributes may be stored in a first folder and plans generated using the same DBMS with a second set of attributes may be stored in a second (possibly similarly named) folder. Since a set including multiple plans may be compared, this operation may select matching plans which correspond to the same query. Plans which are pairs may be identified by a similar nomenclature. Other methods of identifying plans may be used. Comparison tool 205 may know which DBMS (and thus which query plan syntax) to use on account of, for example user input or by reading certain key fields or tags in the query plan.

In each pair of plans, a first database query plan may be based on or produced by a query applied to a DBMS and the second plan may based on the same query applied to the same DBMS after a change has been made to the DBMS. For example, the same DBMS may have its characteristics or attributes changed—data structure or indexing, physical characteristics, amount or other characteristics of data, the optimizer or other tools, etc. Different versions of the same DBMS may be maintained and existing at the same time, for example if query plans need to be generated. In such a case, both versions of the DBMS or of the database may co-exist. If plans to be compared are already stored this may not be necessary.

In operation 330, the first plan in the selected pair is scanned to find an operator (or the next operator), and the second plan is scanned to find the corresponding operator (or the next operator). Each query plan typically includes a number of nodes, rows or lines, but other organizational methods are possible. Typically, the comparisons are done line by line or node by node, pairing a node from one plan to a node from the other plan according to their number (i.e., pairing node i from a first plan with node i from the other plan). The operators may be found for example by searching for the marker or tag used for the relevant DBMS. The comparison tool 205 may include information regarding the tags or markers used by SQL Server or other DBMSs (e.g., in parsing rules 226). For example, in an SQL Server XML query plan format, a node, line or row may include information on each operator along with the estimated cardinality of the tuples to be processed by the operator and the estimated accumulated cost of processing them. This may be expressed, for example, as follows (other formats may be used):

```
<RelOp NodeId="1" PhysicalOp="Compute Scalar"
LogicalOp="Compute Scalar"
EstimateRows="2.58492e+006" EstimateIO="0"
EstimateCPU="0.258492"
AvgRowSize="14" EstimatedTotalSubtreeCost="124123" Parallel="0"
EstimateRebinds="0" EstimateRewinds="0">
    Where:
    LogicalOp="Compute Scalar"
    EstimateRows="2.58492e+006"
    EstimatedTotalSubtreeCost="124123"
```

In operation 340, the two rows, lines or operators may be compared (e.g. based on user-selected or other criteria), and based on each comparison, a difference may be produced or calculated. Typically each row in a first database query plan is compared with a corresponding row in a second database query plan, and based on each comparison, a difference between the compared rows may be calculated. The comparison may be of an operator within or described by the rows (e.g., has the operator changed, moved, been removed or deleted, or added in the second, post-change plan). A comparison of cost or resources needed may include the cost description described by the row in the plan—e.g., the cost calculation provided by the DBMS may be used. Such cost or resource allocations may be provided in different units by different DBMSs, and may be arbitrary units, or units that have some meaning for example corresponding to physical or other resources. Similarly, a comparison of cardinality may include the cardinality described by the row in the plan, provided by the DBMS.

In alternate embodiments, differences in operators may be described which extend beyond individual rows or lines. For example, changes may be detected and reported if an operator is swapped with another operator (e.g., the operators on lines X and X+1 have their positions exchanged), or if an additional operator is inserted, moving the position of following rows and operators down one row or line. Branches of a plan tree that are still preserved but have moved to a different part of the tree may be detected. Differences in specific kinds of operators may be detected. For example, differences in the methods used to access the data (e.g., the use of indexes as opposed to full table scans) and differences in join methods may be detected (e.g., nested loop join as opposed to hash join).

Other aspects of a query plan may be compared. For example, in some plans, the root of a plan tree contains information such as the estimated cardinality of the final result and total cost of the final result of the query. In one SQL DBMS output, the tag <StmtSimple> marks the XML element that contains the root node with the query text followed by the estimated final cardinality in the StatementEstRows property and the total cost in the StatementSubTreeCost property.

In operation 350, an output may be produced for a line. If a difference is found in estimated cardinality, the output may include the difference in cardinality, and possibly both the first (from the first plan) and second cardinality (from the second plan). If a difference is found in estimated cost, the output may include the difference in cost, and possibly both the first and second cost. If a difference is found in the operator, the output may include the operator from each of the first and second plan. If the operator is different from plan to plan, in one embodiment the differences in cost and cardinality for that row are relevant. For example, a DBMS developer or administrator may be interested in learning the difference in the cost of using different operators, or in knowing the difference in the cardinality estimates that may have caused the use of different operators. Output if no difference is found may be an indication of no difference, or no output, depending on the embodiment and possibly user selection. In one embodiment, differences or row changes reported may include, for each row in a first database query plan in a pair, the differences between that row and a corresponding row in the second database query plan in the pair.

The results of the comparison of the row or line may be written, recorded or output to, for example, one or more output files (e.g., files specified by the user, such as specific files within query plan reports 224). This writing or output may be saved, e.g., so it can be analyzed or output later.

In operation 360, if the plans being compared have more lines or rows to compare, the process moves to operation 330, to continue the row-by-row iteration. The row-by-row iteration may be based on or keyed off of the lines in the first plan in the pair, but the iteration may be based on other methods. If no more lines or rows exist, the output file may be completed or written.

In operation 370, if the set of plans being compared includes more pairs of plans, the process moves to operation 320, to continue the plan-by-plan iteration.

In operation 380, a report may be prepared and displayed to a user. Various reports may be prepared. One report may include, side by side, all operators appearing in a pair of plans, and, possibly depending on user selection, the costs and cardinalities, in their order of appearance (e.g., the order used for the pairwise comparisons of nodes). In such a report the operators from a first plan of a pair may appear next to those from the corresponding plan from the pair. Similarly, costs and cardinalities may be shown side by side. FIG. 4 illustrates a detail report according to an embodiment of the present invention. Such a report may include summary information for both plans such as the estimated total number of rows in the final result, and for every node in the plan, it may include its estimated cost (shown in the last two columns labeled EstimatedTotalSubtreeCost) and cardinality (shown in the first two columns, labeled Estimate Rows) side by side. Other formats of plans and other information may be included.

Reports may include each row (e.g., node) in each plan, whether or not a difference exists (e.g., FIG. 4). Alternately, reports may include only those lines where there are differences, or significant differences (e.g., rows or lines where no or insignificant change in a selected category such as operator, cost or cardinality appears). FIG. 5 illustrates a summary report or part of a report, showing differences in estimated cost and cardinality for two plans where operators were preserved (e.g., didn't change), according to an embodiment of the present invention.

FIG. 6 illustrates a further summary report or part of a report, showing differences in operators of the two compared plans, according to an embodiment of the present invention. The report in FIG. 6 shows that for plan 001 there are differences in the number of nodes, in the final estimated cost and in the specific operators. Such a report may include a log including a summary of specific differences found, without detail of the each nodes or operator, rather specific differences. Entries may include, for numeric differences, a percentage difference. For example, a difference may be 150 of a certain unit, and correspond to a 2% difference whereas another difference may be only 1.3 of a certain unit but correspond to 20%. The report may indicate which nodes have differences and what the differences are. Elements of such a report (e.g., percentages) may be included in other reports described herein.

A report can be viewed in various formats, according to embodiments of the present invention and possibly user selection. For example, a report may be viewed as an Excel® spreadsheet, another spreadsheet, or another type of file. Reports may have the format of a file with values separated by, e.g., tabs.

Other operations or series of operations may be used.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method comprising:
   accepting a first database query plan comprising a plurality of rows and a second database query plan comprising a plurality of rows, wherein the first database query plan is based on a query applied to a database management system and the second database query plan is based on the query applied to the database management system after a change has been made to an optimizer which produces an execution plan;
   comparing by a processor each row in the first database query plan with a corresponding row in the second database query plan, and based on each comparison, calculating a difference between the compared rows,
      wherein the comparison comprises a comparison of a cardinality of the rows and of an operator within the rows; and
   recording each difference in an output file.

2. The method of claim 1, wherein the comparison comprises a comparison of the cost described by the rows.

3. The method of claim 1, including querying a user for input to use as the comparison.

4. The method of claim 1, including preparing a report of the difference between the compared rows.

5. The method of claim 1, wherein the report includes a summary report showing the cardinalities of rows and a costs described by the compared rows side by side.

6. A system comprising:
   a memory to store at least a first database query plan comprising a plurality of rows and a second database query plan comprising a plurality of rows, wherein the first database query plan is based on a query applied to a database management system and the second database query plan is based on the query applied to the database management system after a change has been made to the data managed by the database management system; and
   a processor configured to accept the first database query plan and the second database query plan, compare each row in the first database query plan with a corresponding row in the second database query plan, and based on each comparison, calculate a difference between the compared rows, and record each difference in an output file,
      wherein the comparison comprises a comparison of a cardinality of the rows and of an operator within the rows.

7. The system of claim 6, wherein the comparison comprises a comparison of the cost described by the rows.

8. The system of claim 6, wherein the processor is configured to querying a user for input to use as the comparison.

9. The system of claim 6, wherein the processor is configured to prepare a report of the difference between the compared rows.

10. The system of claim 6, wherein a part of a report shows the cardinalities of rows and a cost described by the compared rows side by side.

11. A method comprising:
    for a first database query plan comprising a plurality of operators, the first database query plan produced by a database management system from a query; and a second database query plan comprising a plurality of operators, the second database query plan produced by the database management system from the query after a change has been made to the database management system or an optimizer which produces an execution plan:
    comparing, by a processor, corresponding operators in the first database query plan and the second database query plan to determine a set of changes,
       wherein the comparison comprises a comparison of a cardinality of rows of the first and the second database query plans and of an operator within the rows; and
    providing the changes to a user.

12. The method of claim 11, wherein the comparison comprises a comparison of the cost described by the operators.

13. The method of claim 11, wherein the operator changes comprise, for each operator in the first database query plan, the differences between that operator and a corresponding operator in the second database query plan.

14. The method of claim 11, including querying a user for input to use as the comparison.

15. The method of claim 11, including preparing a report of the difference between the compared operators.

16. The method of claim 11, wherein the report or part of the report shows a summary of the cardinalities of rows and a cost described by the operators.

* * * * *